Patented Feb. 3, 1953

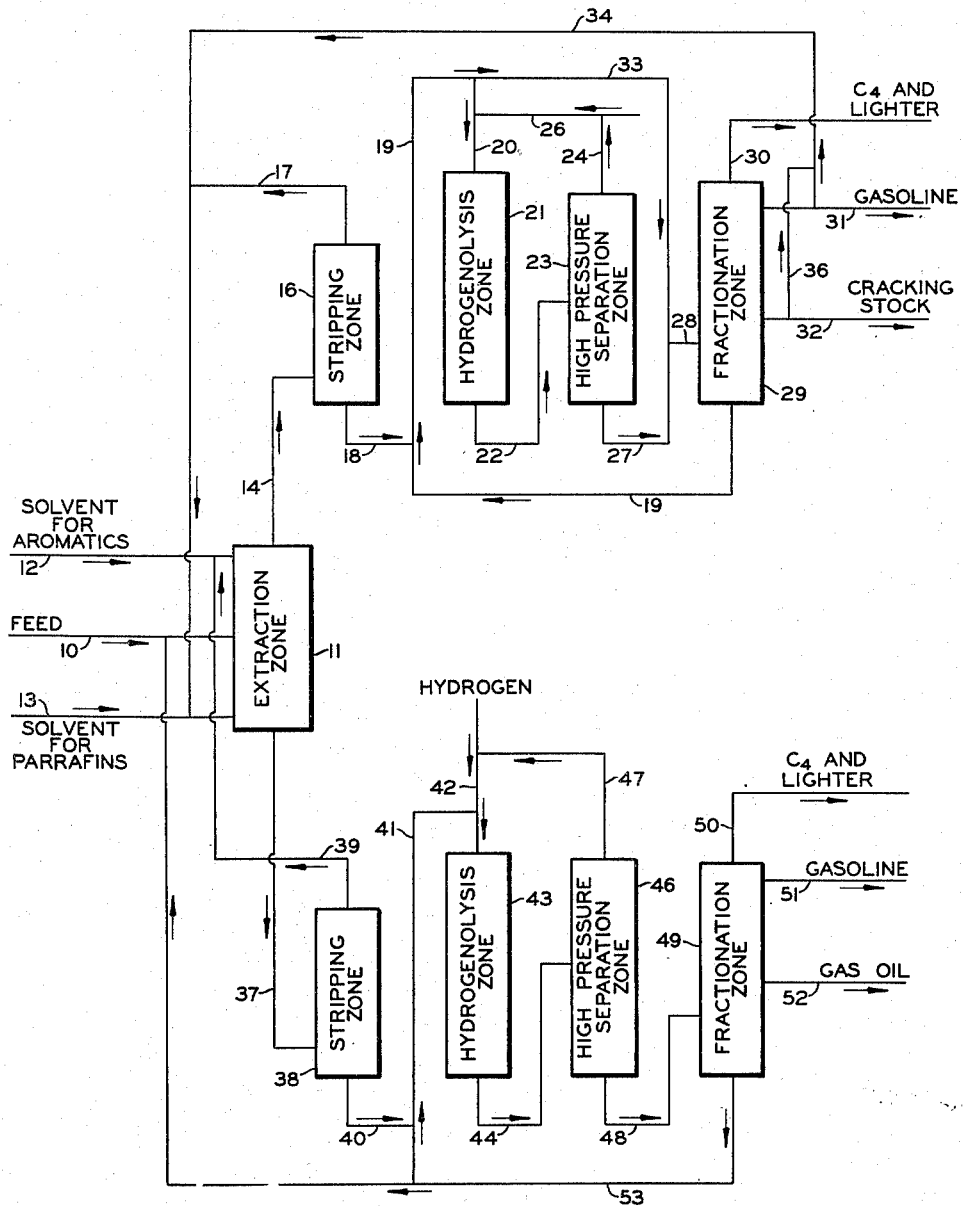

2,627,495

UNITED STATES PATENT OFFICE 2,627,495

HYDROGENOLYSIS PROCESS FOR THE PRODUCTION OF A GOOD QUALITY GAS OIL AND GASOLINE FROM A HEAVY RESIDUUM HYDROCARBON OIL

William C. Lanning, Bartlesville, Okla., assignor to Phillips Petroleum Company, a corporation of Delaware Application November 25, 1949, Serial No. 129,441

5 Claims. (Cl. 196—14.11)

This invention relates to an improved process for the hydrogenolysis of hydrocarbonaceous materials. In one of its more specific aspects it relates to a process for the hydrogenolysis of petroleum residues such as topped crude, reduced crude, cracking residuum, shale oil, and the like. One specific embodiment of the invention relates to a novel process for the hydrogenolysis of hydrocarbonaceous materials, the resulting products of which include good quality gasoline and diesel fuel.

The hydrogenolysis of residual hydrocarbon stocks and like heavy hydrocarbons to produce lower boiling hydrocarbons is not a new art. It was first developed in Germany, the field being quite completely explored. However, the process has never enjoyed widespread use for several reasons. For example, such a process is considerably expensive, particularly in the outlay necessary for processing equipment and for the production of the large quantities of hydrogen necessary. Another reason is that depending on the feed, only one good quality product is obtained, that is, gasoline or diesel fuel. The reason for this apparently lies in the fact that hydrogenolysis products from paraffinic feed provide high quality diesel fuel with good cetane number and products from aromatic feed provide good quality gasolines with high octane numbers. Obviously, it would be to everyone's advantage if a hydrogenolysis process were developed whereby both high quality gasoline and diesel fuel were produced.

An object of this invention is to provide an improved process for the hydrogenolysis of hydrocarbonaceous materials.

Another object is to provide a process for the hydrogenolysis of residual fractions such as from crude oil.

Another object of this invention is to provide a hydrogenolysis process for the treatment of hydrocarbons whereby both good quality gasoline and gas oil or diesel fuel are obtained.

Still another object is to provide a process for the treatment of oils containing both aromatics and paraffins whereby each of these groups of materials is advantageously treated to provide a total product including improved gasoline and gas oil.

I have found that the treatment of a mixture of paraffins and aromatics provides products inferior to those produced by separate treatment. This may be caused by the fact that the optimum hydrogenolysis conditions for paraffins are not optimum for aromatics.

I have discovered an improved process for the treatment of a residuum hydrocarbon material containing both paraffins and aromatics whereby such a material is first extracted to separate same into paraffinic and aromatic fractions, these fractions then being individually treated in a hydrogenolysis process at optimum conditions. By following the teachings of my process maximum yields of high-quality products are obtained.

It is to be understood that the aromatic fractions separated by the process of this invention may also contain some cycloparaffins which are preferentially dissolved by the solvent for the aromatics. The presence of these materials has not been found to cause any deleterious effects when such fractions are further treated by hydrogenolysis.

In accordance with my invention charge stocks, usually a residuum with an initial boiling point of 700° F. such as, for example, topped crude, reduced crude, vacuum reduced crude, bottoms from propane deasphalting of reduced crude, topped crude cracking residuum, naphtha cracking tar, and like materials containing paraffins and aromatics, are solvent extracted utilizing as extractive solvents materials such as sulfur dioxide, furfural, methyl Cellosolve, and nitrobenzene. It is preferable that the feed stocks are of such character that the aromatic extract obtained therefrom comprises 20 to 80 volume per cent of the total. For example, in processing a stock such as an 850° F. plus vacuum reduced topped crude cracking residuum containing at least 20 volume per cent aromatics, the aromatic extract is desirably of a gravity of not more than about 10 API and preferably not more than about 5 API. This feed stock may be extracted either with only one solvent or by a dual solvent process. The former process will be discussed first.

A charge of the above described character is liquid-liquid extracted at known conditions to provide a paraffinic fraction recovered as overhead and an aromatic fraction recovered as a bottoms product. The paraffinic fraction which contains only a minor portion of solvent is stripped of solvent and then preferably passed to a hydrogenolysis zone where it is contacted with a sulf-active catalyst of the type such as molybdenum oxide on alumina or on silica-alumina made either by impregnation or coprecipitation. Other catalysts may be used besides those listed above such as the sulfides of molybdenum and related materials, preferably supported in some manner. For the treatment of the paraffinic fraction preferable conditions are: temperature—850 to 900° F., pressure—2000 to 5000 p. s. i. (preferably above 3500 p. s. i.), feed rate—0.5 to 4 liquid volumes per volume of catalyst per hour (preferably 1.5 to 3 liquid volumes per volume per hour), a hydrogen circulation rate of 5000 to 20,000 cubic feet per barrel of feed to the reactor, and a per pass conversion of 40 to 60 per cent of the total feed. Effluent is withdrawn from the hydrogenolysis zone and is separated in a manner such that the hydrogen may be recycled to the hydrogenolysis zone. The remaining effluent is fractionated to obtain $C_4$ and lighter hydrocarbons, gasoline, gas oil which may be used as diesel fuel or for a cracking stock, and residuum. The cuts obtained by fractionation may be varied considerably depending on the materials desired and the feed and reaction conditions and are not to be limited by the above recitation. The residuum from the fractionation may be used as fuel oil or preferably may be recycled to the hydrogenolysis zone for further treating. This latter step is usually desirable because such residuum generally contains at least a portion of unreacted feed, and because it enhances the economy of the process.

The aromatic fraction containing the extracting solvent is passed to a suitable solvent removal zone such as may comprise pressure reduction and/or heating, wherein the solvent is stripped from the aromatic material and from which the solvent is recycled to the extraction zone. The thus obtained aromatic fraction is then passed to a hydrogenolysis zone for treatment under conditions different from those used in treating the paraffinic material. Suitable operating conditions for the treatment of this material are: temperature, 900 to 950° F.; pressure, 200 to 5000 p. s. i. (preferably 2000 to 4000 p. s. i.); feed rate 0.5 to 4 liquid volumes per volume of catalyst per hour (preferably 1 to 2 liquid volumes per volume per hour); and a hydrogen circulation rate of 5000 to 10,000 cubic feet per barrel of feed. It is preferable that the particular operating conditions be chosen within the above ranges to produce conversion of the fresh charge from 60 to 90 per cent. The effluent from the hydrogenolysis zone is passed to a suitable high pressure separation zone wherein the hydrogen is recovered for recycle. The remaining products are then passed to fractionation wherein fractions of $C_4$ and lighter, gasoline, gas oil, and residuum are obtained. Here again, applicant does not wish to be limited by the particular fractions recovered, the above being given merely to exemplify his invention. The residual fraction and the gas oil if desired, may be recycled to the hydrogenolysis step for further treatment inasmuch as it will contain at least some untreated material, or it may be recycled directly to the extraction zone where it is introduced along with fresh feed.

As a second and preferred embodiment of my invention I practice the above discussed process utilizing two solvents, one for the aromatic hydrocarbons already discussed and one for the paraffinic hydrocarbons. Suitable solvents for the paraffinic fraction are propane, butane, hexane, and gasoline or gas oil-boiling range materials. When such solvents are used, suitable recovery means must be employed to separate them from the fraction they extract for recycle. A still more preferred method of operation is to use as the second solvent, i. e. the solvent for the paraffins, the gasoline and/or gas oil obtained from fractionating the paraffin hydrogenolysis products. Inasmuch as the hydrogenolysis of the paraffins is operated under conditions to produce only a minimum of gasoline and inasmuch as such gasoline is not of a premium quality, this is a desirable use for such gasoline. Obviously, the quantity of gasoline or gas oil product will build up in such a process and in view of this it may either be used as a one-pass solvent without separation before fractionation or may be separated by suitable means and recycled. When the solvent is recycled, only a sufficient quantity may be recovered from the raffinate in the stripping zone to take care of the extraction. The remaining portion may be allowed to pass on through to fractionation. In any event a certain quantity of the material will be withdrawn from the fractionation zone over and above that necessary for the extractive solvent. Such gasoline range materials may be advantageously treated by means not shown in the attached drawing such as reforming and the like.

A more complete understanding of my process may be obtained by referring to the attached schematic flow diagram of the preferred modification of my invention. The valves, pumps, and other similar equipment have not been included in the drawing to keep it as simple and easy to follow as possible, however, one skilled in the art may readily supply such equipment after reading the following discussion.

Refer now to the drawing. A feed material containing both aromatics and paraffins is passed via line 10 to extraction zone 11 where it is contacted with a solvent for aromatics introduced via line 12 and a solvent for paraffins introduced via line 13. It is apparent from the drawing that contacting is by countercurrent flow, each of the solvents being introduced at the opposite end from which the fraction they selectively dissolve is removed. Extracted paraffin and solvent are removed from extraction zone 11 via line 14 and are passed to stripping zone 16 where, by suitable means previously discussed and well within the skill of the art, the solvent is separated from the paraffins and is recycled to the extraction zone via lines 17, 34, and 13. The separated paraffins are then passed from stripping zone 16 via lines 18, 19 and 20 to hydrogenolysis zone 21. In this zone they are contacted with a suitable catalyst at the desired operating conditions selected from the ranges previously discussed, and are upgraded as desired. The treated materials are withdrawn from the catalyst zone by means of line 22 and are passed therethrough to high pressure separation zone 23 for the removal of hydrogen. Separated hydrogen is passed overhead and recycled to the hydrogenolysis zone via lines 24, 25, and 20. Fresh hydrogen may also be introduced via lines 26 and 20. The treated hydrocarbons are then recovered through line 27 and pass therefrom through line 28 to fractionation zone 29. In this zone these materials are separated, generally into a $C_4$ and lighter fraction recovered overhead through line 30, a gasoline fraction recovered through line 31, a cracking stock or diesel oil fraction recovered through line 32 and a residual fraction recovered through line 19. This latter residual fraction is preferably recycled through line 20 back to the hydrogenolysis zone. Part of the gasoline fraction recovered from zone 29 through line 31 is recycled to extraction zone 11 through lines 34 and 13 as one of the extractive solvents. Alternatively or in addition, part of the cracking stock recovered through line 32 may also be recycled for use as one of the solvents through lines 36, 34 and 13.

The aromatic fraction recovered from the bottom of extraction zone 11 via line 37 is passed to stripping zone 38 for removal of the solvent. This solvent is then recycled to zone 11 via lines 39 and 12. The separated aromatic fraction is then passed by means of lines 40, 41, and 42 to hydrogenolysis zone 43 where it is contacted in a hydrogen atmosphere with a suitable hydrogenolysis catalyst of the type described above.

The treated material is recovered from this zone by means of line 44 and is passed therethrough to high pressure separation zone 46 where the hydrogen is separated and recycled through lines 47 and 42 to hydrogenolysis zone 43. Fresh hydrogen is introduced to zone 43 by means of line 42. The product from separation zone 46 is passed by means of line 48 to fractionation zone 49 where it is separated into suitable fractions. A C₄ and lighter fraction is recovered through line 50, a gasoline fraction is recovered via line 51, a gas oil fraction is recovered via line 52, and a residual fraction is recovered through line 53. This residual fraction may be recycled either to hydrogenolysis zone 43 through lines 41 and 42 or to extraction zone 11 along with the fresh feed through line 10. Part of the gas oil in line 52 may be similarly recycled, although some is usually withdrawn and utilized, e. g. as feed to a carbon black process.

The following example illustrates some of the advantages of this invention. The reactants and their proportions and other specific ingredients are presented as being typical and should not be construed to limit this invention unduly.

*Example*

An 11 API gravity vacuum reduced topped crude cracking residuum is solvent extracted utilizing furfural and subsequently produced paraffinic gasoline as solvents to produce a 17 API gravity paraffinic fraction and a —3 API aromatic fraction. The 17 API gravity fraction is subjected to hydrogenolysis over a molybdena-alumina catalyst at a temperature of 875° F. and a pressure of 400 p. s. i. The feed rate is 2 volumes of liquid per volume of catalyst per hour. These conditions are chosen to provide a 50 per cent conversion per pass. The ultimate yields of products based on the charge are:

Gasoline—15 volume percent, clear octane number 38
400 to 600° F. gas oil—35 volume percent, cetane number 60
600 to 850° F. cracking stock—46 volume percent, API gravity 32, aniline point 207° F.

The —3 API gravity fraction is also subjected to hydrogenolysis over a molybdena-alumina catalyst but at 925° F. and a pressure of 4000 p. s. i. The space velocity utilized is 1.5 liquid volumes of charge per volume of catalyst per hour. The above conditions are selected to provide 80 per cent conversion of fresh feed per pass. The ultimate yields of products are:

Gasoline—81 volume percent, octane number 71
400° F.+—gas oil, 20 vol. percent, cetane number 0, aniline point 8° F.

Hydrogenolysis of the charge without separation is carried out over a molybdena on alumina catalyst at 900° F. and at a 67 per cent conversion. Ultimate yields of products are:

Gasoline—23 volume percent, octane number 41
400 to 600° F. gas oil 24 volume percent, cetane number 45
600 to 880° F. cracking stock 65 volume percent, API gravity 24, aniline point 160° F.

A comparison of the above data shows that by operating in accordance with the teachings of my invention higher quality gasoline and gas oil or diesel fuel are obtained than those obtained when the total feed is treated together.

Although this process has been described and exemplified in terms of its preferred modifications, it is understood that various minor changes may be made without departing from the spirit and scope of the disclosure and of the claims.

I claim:

1. A process for the hydrogenolysis of a heavy residuum hydrocarbon oil containing both paraffins and aromatics, which comprises extracting a heavy hydrocarbon oil with a solvent which selectively dissolves aromatics, passing the paraffin raffinate to a hydrogenolysis process where it is treated at a temperature in the range of 850 to 900° F., a pressure in the range of 3500 to 5000 p. s. i., a feed rate of 0.5 to 4 liquid volumes of charge per volume of catalyst per hour, and with a hydrogen circulation of 5000 to 20,000 cubic feet per barrel of feed, separating the products of this hydrogenolysis and recovering gasoline having an end boiling point of 400° F. and a good quality gas oil; separating the solvent from said aromatics, passing the aromatic extract to a hydrogenolysis process where it is treated at different conditions at a temperature in the range of 900 to 950° F., a pressure on the range of 2000 to 4000 p. s. i., a feed rate of 0.5 to 4 liquid volumes of charge per volume of catalyst per hour, and with a hydrogen circulation rate in the range of 5,000 to 10,000 cubic feet per barrel of feed, separating the products of this second hydrogenolysis and recovering a good quality gasoline, and recycling the gasoline boiling range materials from the paraffin hydrogenolysis product to said extraction as a solvent for paraffins.

2. A process according to claim 1 wherein the reaction conditions in the hydrogenolysis steps are so selected that in the treatment of the paraffins a per pass conversion of 40 to 60 per cent based on the total feed is maintained and in the treatment of the aromatics a per pass conversion of 60 to 90 per cent is maintained.

3. A process according to claim 1 wherein at least part of said gas oil from said paraffin hydrogenolysis is recycled to the extraction zone as additional solvent for the paraffins.

4. A hydrogenolysis process for treating heavy hydrocarbon oils containing paraffins and aromatics, which comprises passing an oil containing 20 to 80 per cent aromatics to an extraction zone, contacting said oil with a solvent for said aromatics and a solvent for the paraffins, recovering said paraffins and the solvent therefor and separating same, recycling separated solvent back to said extraction zone, passing the paraffins to a hydrogenolysis zone where they are treated in the presence of a molybdenum oxide-alumina hydrogenolysis catalyst at a temperature of 875° F., a pressure of 3500 to 5000 p. s. i., a feed rate of 1.5 to 3 liquid volumes per volume of catalyst, and with a hydrogen circulation rate of 5000 to 20,000 cubic feet per barrel of feed, passing effluent from said hydrogenolysis zone to a separation zone where unreacted hydrogen is flashed off for recycle, passing the effluent from said separation zone to a fractionation zone where it is divided into a C₄ and lighter fraction, a gasoline fraction having an end boiling point of 400° F., a gas oil fraction of good quality, and a residue fraction, passing said residue back to said hydrogenolysis zone for further treatment, passing said gasoline back to said extraction zone as said solvent for paraffins; recovering the aromatics and the solvent therefor from said extraction zone and passing same to a separation zone where the solvent is removed and recycled to said extraction zone, passing the aromatics from said separation zone to a second hydrogenolysis zone where it is reacted at a temperature of 925° F., a pressure of 2000 to 4000 p. s. i., a feed rate of 1 to 2 liquid volumes per volume of catalyst per hour and a hydrogen circulation rate of 5000 to 10,000 cubic feet per barrel over a molybdenum oxide-alumina catalyst, passing the effluent from said second hydrogenolysis zone to a separation zone where unreacted hydrogen is flashed off for recycle, passing the effluent from said separation zone to a fractionation zone where it is divided into a $C_4$ and lighter fraction, a good quality gasoline fraction, a gas oil fraction, and a residue fraction, and recycling said residue fraction to said extraction zone for reprocessing.

5. A process according to claim 4 wherein the hydrogenolysis processes are carried out over molybdenum oxide-containing catalysts.

WILLIAM C. LANNING.

REFERENCES CITED

The following references are of record in the file of this patent:

UNITED STATES PATENTS

| Number | Name | Date |
|---|---|---|
| 2,123,642 | Gaylor | July 12, 1938 |
| 2,149,900 | Pier et al. | Mar. 7, 1939 |
| 2,335,684 | Mayer | Nov. 30, 1943 |
| 2,366,490 | Cloud | Jan. 2, 1945 |
| 2,374,102 | Jahn et al. | Apr. 17, 1945 |
| 2,415,700 | Meier | Feb. 11, 1947 |

FOREIGN PATENTS

| Number | Country | Date |
|---|---|---|
| 333,550 | Great Britain | Aug. 11, 1930 |
| 443,339 | Great Britain | Feb. 26, 1936 |